May 19, 1959  G. L. HUEY ET AL  2,887,234
KNOCKDOWN "A" FRAME CONSTRUCTION
Filed Dec. 28, 1955  5 Sheets-Sheet 1

INVENTORS
Guy L. Huey a
Elliott J. Kies
BY
Frease & Bishop
ATTORNEYS

May 19, 1959 G. L. HUEY ET AL 2,887,234
KNOCKDOWN "A" FRAME CONSTRUCTION
Filed Dec. 28, 1955 5 Sheets-Sheet 2
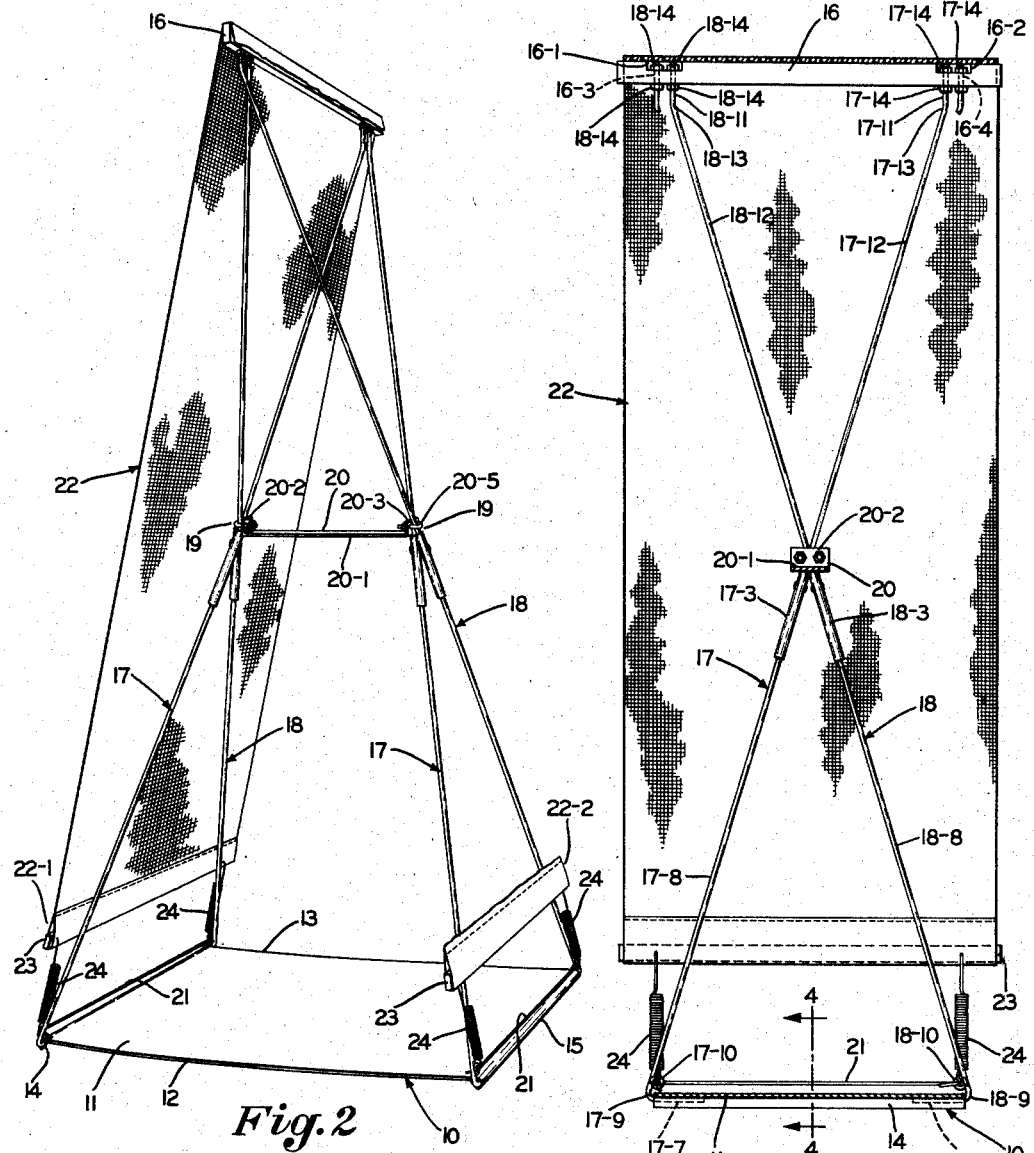
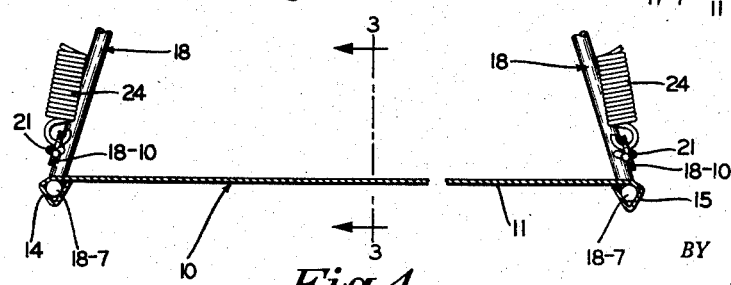
INVENTORS
Guy L. Huey and
Elliott J. Kies
BY Frease & Bishop
ATTORNEYS May 19, 1959

G. L. HUEY ET AL 2,887,234

KNOCKDOWN "A" FRAME CONSTRUCTION

Filed Dec. 28, 1955

INVENTORS
Guy L. Huey and
Elliott J. Kies
BY Frease & Bishop
ATTORNEYS

May 19, 1959  G. L. HUEY ET AL  2,887,234
KNOCKDOWN "A" FRAME CONSTRUCTION
Filed Dec. 28, 1955  5 Sheets-Sheet 4
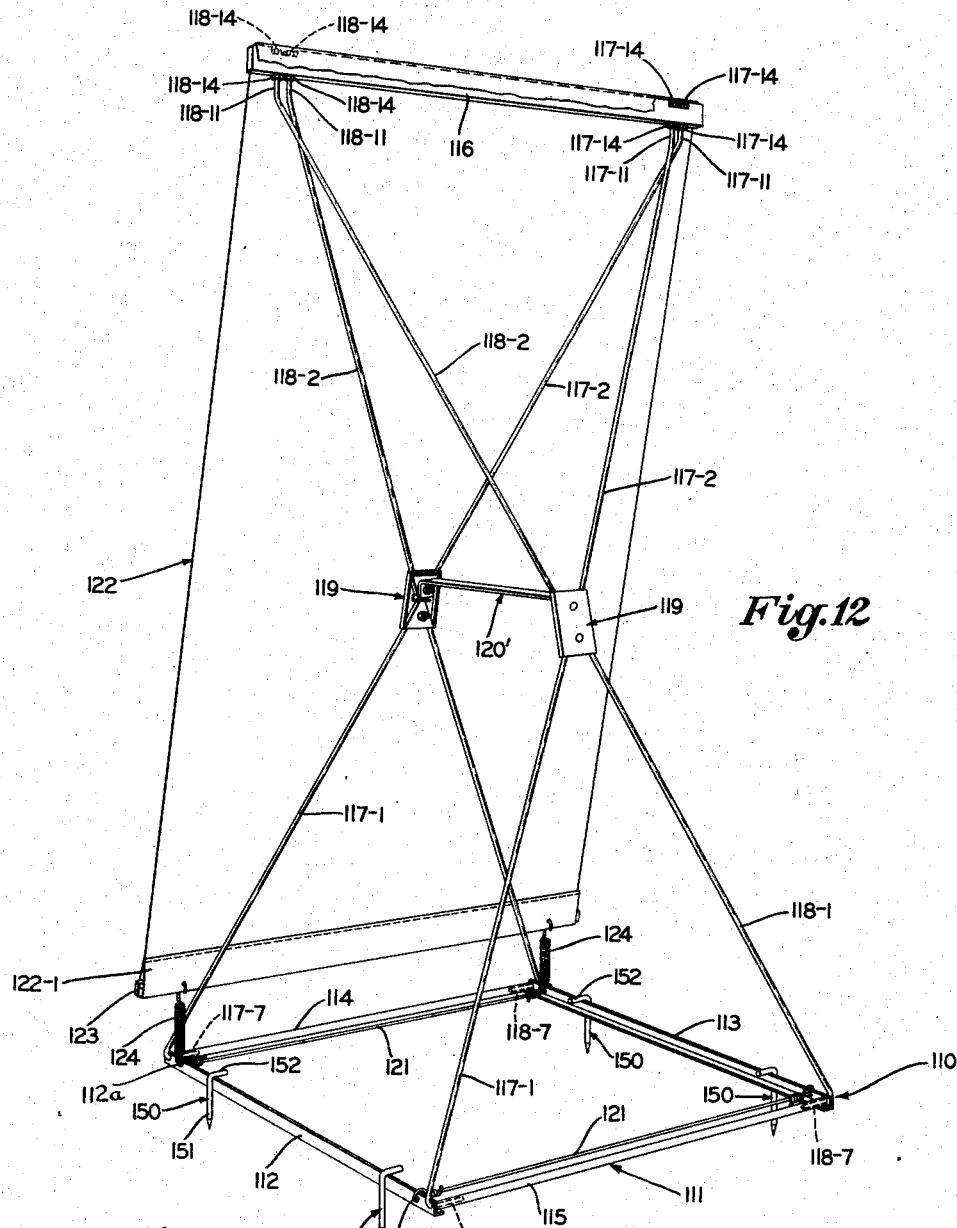
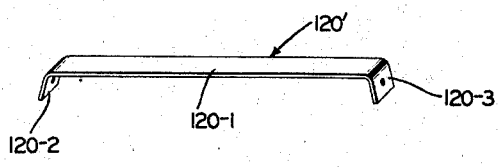
INVENTORS
Guy L. Huey and
Elliott J. Kies
BY Frease & Bishop
ATTORNEYS

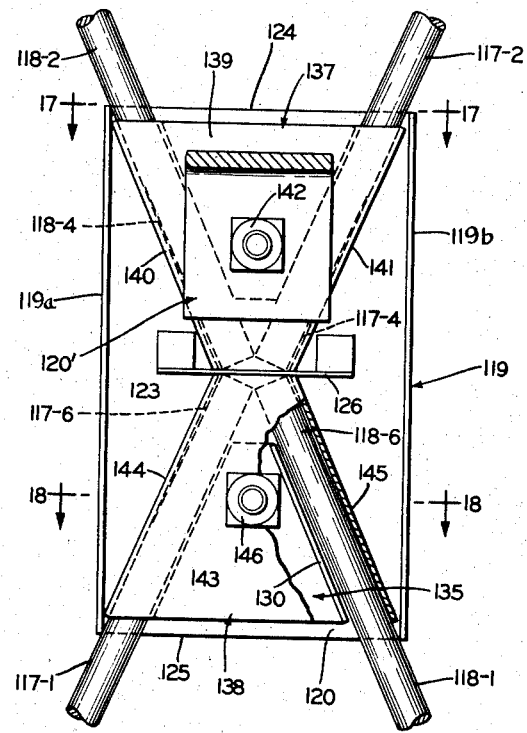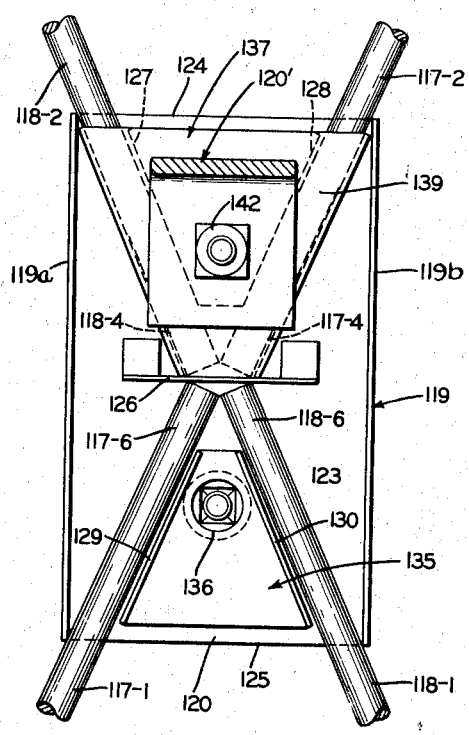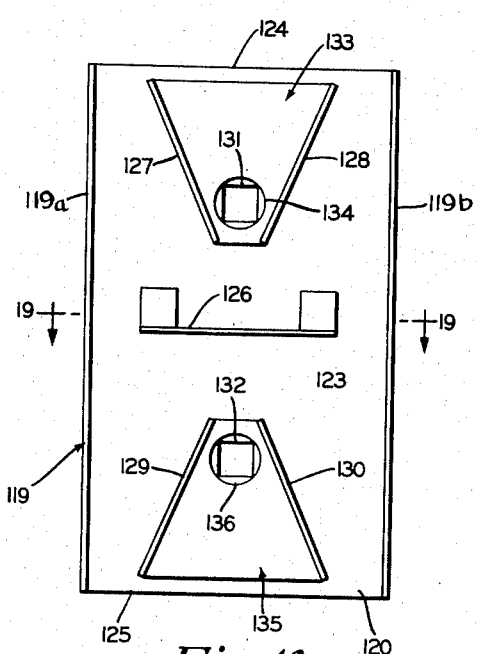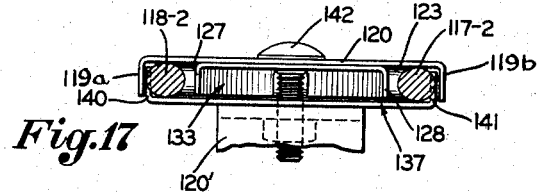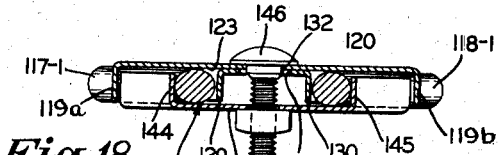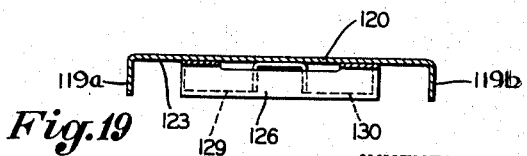

United States Patent Office 2,887,234
Patented May 19, 1959

2,887,234
KNOCKDOWN "A" FRAME CONSTRUCTION

Guy L. Huey and Elliott J. Kies, Massillon, Ohio, assignors to The Massillon-Cleveland-Akron Sign Company, Massillon, Ohio, a corporation of Ohio Application December 28, 1955, Serial No. 555,843

10 Claims. (Cl. 211—177)

The invention relates in general to A frame unit construction, each unit including a base, a ridge member spaced above the base, and frame members interposed and connected between the base and the ridge member; and more particularly the invention relates to such an A frame unit including opposite panels of sheet material supported between the base and the ridge member, each panel being adapted to carry a sign, or to have a sign imprinted thereon. Such a sign bearing A frame unit may be used for example at the street bordering areas of a filling station plot, as the best location for attracting the attention of persons in automobiles or other vehicles passing the filling station plot on the bordering street or streets.

For such advertising purposes, the best results are obtained when a considerable number of sign bearing A frame units are located at intervals along the street bordering areas of the filling station plot. Such advertising sign bearing A frame units are more frequently used for special promotions, and are usually supplied by the gasoline distributors serving the filling station.

Such an assembled advertising sign bearing A frame unit has a substantial bulk, and the distribution costs would be prohibitive if such A frame units were supplied in the assembled condition to the filling stations served by the distributor.

The objects of the present invention include the provision of an improved advertising sign bearing A frame unit construction which is collapsible, from the assembled condition, and which includes parts of simplified construction and arrangement, and which are easily assembled and disassembled without the use of tools, and which in the collapsed or disassembled condition may be packaged as a unit having a bulk which is very limited with respect to the bulk of the assembled A frame unit.

The foregoing and other objects are attained by the improved A frame construction, parts, combinations, and subcombinations, which comprise the present invention, and the nature of which is set forth in the following general statement, and preferred embodiments of which, together with their mode of use, are set forth in the following description, and which are particularly pointed out and set forth in the appended claims forming part thereof.

The nature of the improvements of the present invention may be described in general terms as constituting A frame construction in which an assembled A frame unit includes interfitting and interconnecting parts put together without tools. The parts of the assembled A frame unit are separable from each other without tools, and collapsible into a package unit having a bulk which is limited as compared with the bulk of the assembled A frame unit.

The assembled A frame unit includes a preferably rectangular base, a frame member connecting means adjacent each of the four end corners of the base, a ridge frame member spaced from the base and extending preferably parallel with the base and with preferably parallel end members of the base, and two sets of X-strut frame members. The X-strut frame members of each set have a crossing, and each X-strut frame member of each set extends diagonally with respect to a corner of the base and an end portion of the ridge frame member. Each set of X-strut frame members includes two members with lower end hook portions in engagement with two of the base connecting means, and each set of X-strut frame members includes two members each having an angled threaded upper end portion. The ridge frame member has a plurality of bores at each end, and each X-strut frame member threaded upper end portion extends through one of the ridge frame member bores, and is secured to the ridge frame member by nuts screwed on its threads. The X-strut frame member of each set at their crossing have a connection with a tie member extending between the crossings. Preferably, a one-piece rectangular cover extends over the ridge frame member and has ends depending from the ridge frame member, and spring means connect each end of the cover with lower unit members.

By way of example, preferred embodiments of the improved collapsible A frame construction and component parts of the present invention are illustrated in the accompanying drawings forming part hereof, in which:

Fig. 2 is a perspective view similar to Fig. 1, with the hold-down weights removed, and with a portion of the cover broken away.

Fig. 3 is a vertical sectional view of the assembled A frame unit of Figs. 1 and 2, as on line 3—3, Fig. 4, looking in the direction of the arrows.

Fig. 4 is an enlarged fragmentary vertical sectional view thereof, as on line 4—4, Fig. 3, looking in the direction of the arrows.

Fig. 12 is a perspective view of another assembled A frame unit constituting a second preferred embodiment of the present invention, with hold-down hook stakes on its base, and with front portions of its cover broken away.

Fig. 13 is a detached oblique view of the crossing connecting tie member of the A frame unit of Fig. 12.

Fig. 14 is an enlarged inside fragmentary elevational view of portions of the rear set of X-strut frame members and the X-crossing connector means therefor and the end of the tie member connected therewith, portions of the X-crossing connector means being broken away and shown in section.

Fig. 15 is a view similar to Fig. 14, showing a partial assembly of the completely assembled parts shown in Fig. 14.

Fig. 16 is a detached elevational view of the backing plate of the X-crossing connector means shown in Figs. 14 and 15.

Fig. 17 is a transverse sectional view, as on line 17—17, Fig. 14, looking in the direction of the arrows.

Fig. 18 is another transverse sectional view, as on line 18—18, Fig. 14, looking in the direction of the arrows.

Fig. 19 is a transverse sectional view, as on line 19—19, Fig. 16, looking in the direction of the arrows.

Similar numerals refer to similar parts throughout the several views.

Figure 1:
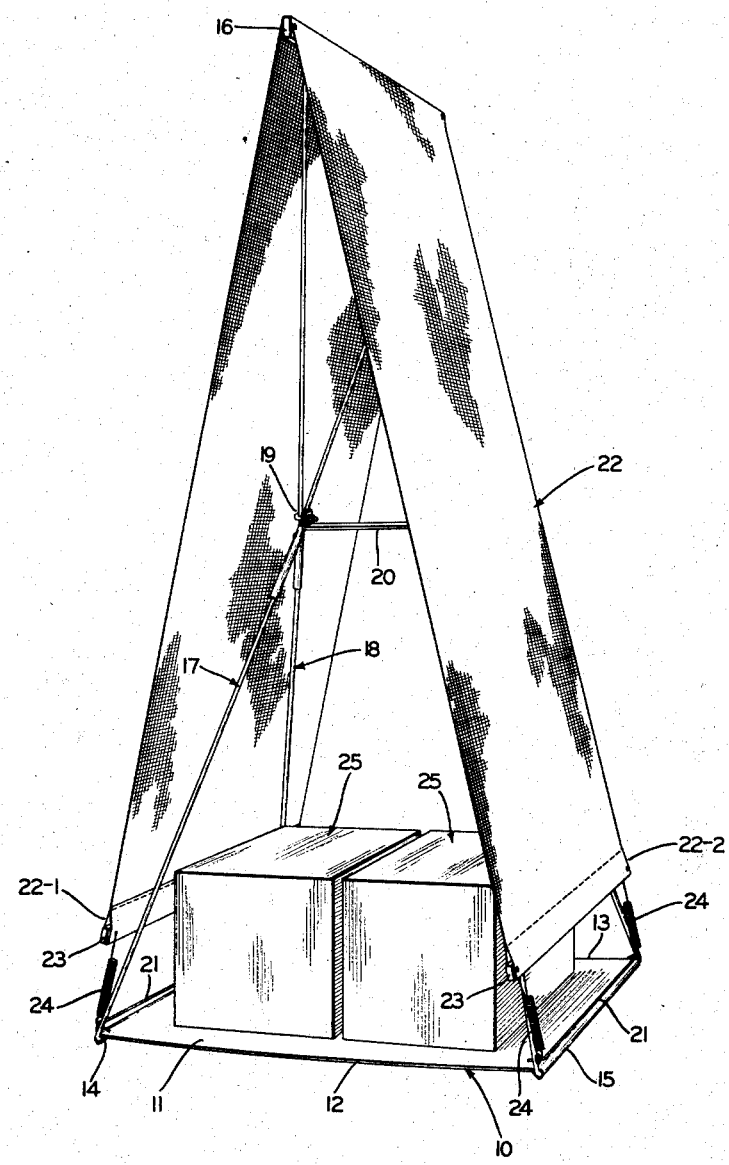
Fig. 1 is a perspective view of an assembled A frame unit constituting a preferred embodiment of the present invention, with hold-down weights on its base.

A preferred embodiment of the assembled A frame unit of the present invention is indicated generally by 10, and illustrated in Figs. 1 to 4, inclusive. The component parts of the assembled A frame unit 10 are shown separately in Figs. 5 to 11, inclusive.

The assembled A frame unit 10 includes a rectangular base indicated generally by 11, preferably made of sheet metal, and having side edges 12 and 13 and tubes 14 and 15 formed at its opposite ends. The tubes 14 and 15 open at end corners of the base 11.

A ridge frame member indicated generally by 16 is spaced above the base 11 and extends parallel with the top flat face of the base 11 and with the parallel end tubes 14 and 15.

A set of X-strut frame members 17 and 18 extends between and has separable connections with the corner openings of the base end tube 14 and end portions of the ridge frame member 16. Similarly, another set of X-strut frame members 17 and 18 extends between and has separable connections with corner openings of the base end tube 15 and end portions of the ridge frame members 16.

The X-strut frame member 18 of each set extends on the outside of the X-strut frame member 17 of the set at a crossing 19.

A tie member indicated generally by 20 extends between the crossings 19 of the two sets of X-strut frame members 17 and 18, and at each crossing 19 the tie member 20 has a separable connection with the frame members 17 and 18.

Lower end portions of the X-strut frame members of each set are separably connected by a hook tie rod 21.

A one-piece rectangular cover indicated generally by 22 extends over the ridge frame member 16, and includes opposite end sleeves 22–1 and 22–2 spaced respectively above the base end tubes 14 and 15. In each of the end sleeves 22–1 and 22–2, there is located a pull bar 23. Cover hold-down helix springs 24, one at each lower corner of the assembled A frame unit 10, each has a separable connection with one of the pull bars 23 and the sleeve 22–1 or 22–2 in which it is located, and with a lower end portion of one of the X-strut frame members 17 or 18.

Figure 5:
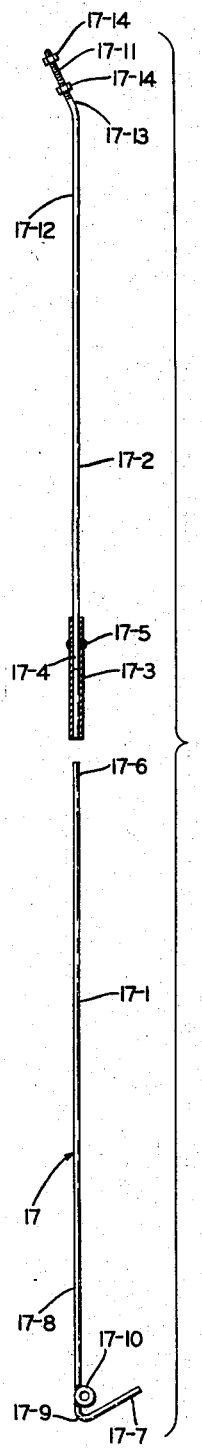
Fig. 5 is a detached disjointed elevational view of one of the X-strut frame members of a crossing set of X-strut frame members of the assembled A frame unit.

Each X-strut frame member 17, as best shown in Fig. 5, includes a bottom section 17–1 and a top section 17–2. A telescope joint sleeve 17–3 has its upper end portion fitted on the lower end portion 17–4 of the X-strut frame member top section 17–2, and a rivet connector 17–5 secures the sleeve 17–3 on the lower end portion 17–4.

The lower end portion of the sleeve 17–3 extends beyond the lower extremity of the lower end portion 17–4 of the X-strut frame member top section 17–2. The X-strut frame member bottom section 17–1 has an upper end portion 17–6 which separably fits in the lower end portion of the sleeve 17–3. The X-strut frame member bottom section 17–1 is shown separated from the X-strut frame member top section 17–2, in Fig. 5.

The X-strut frame member bottom section 17–1 includes a lower hook end portion 17–7 extending at an acute angle from the elongated central portion 17–8, there being an apex 17–9 between the hook end portion 17–7 and the central portion 17–8.

A hook catch annular washer 17–10 is welded to the central portion 17–8 of the X-strut frame member bottom section 17–1, at a location spaced from the apex 17–9.

The X-strut frame member top section 17–2 has a threaded end portion 17–11 extending at an obtuse angle from the central portion 17–12, there being an apex 17–13 between the threaded end portion 17–11 and the central portion 17–12. Nuts 17–14 are separably screwed on the threaded end portion 17–11.

Figure 6:
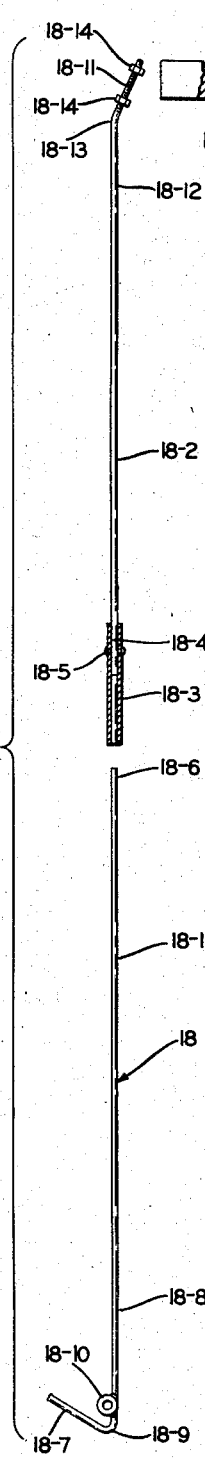
Fig. 6 is a detached disjointed elevational view of the other X-strut frame member of a crossing set of X-strut frame members of the assembled A frame unit.

Each X-strut frame member 18, as best shown in Fig. 6, includes a bottom section 18–1 and a top section 18–2. A telescope joint sleeve 18–3 has its upper end portion fitted on the lower end portion 18–4 of the X-strut frame member top section 18–2, and a rivet connector 18–5 secures the sleeve 18–3 on the lower end portion 18–4.

The lower end portion of the sleeve 18–3 extends beyond the lower extremity of the lower end portion 18–4 of the X-strut frame member top section 18–2. The X-strut frame member bottom section 18–1 has an upper end portion 18–6 which separably fits in the lower end portion of the sleeve 18–3. The X-strut frame member bottom section 18–1 is shown separated from the X-strut frame member top section 18–2, in Fig. 6.

The X-strut frame member bottom section 18–1 includes a lower hook end portion 18–7 extending at an acute angle from the elongated central portion 18–8, there being an apex 18–9 between the hook end portion 18–7 and the central portion 18–8.

A hook catch annular washer 18–10 is welded to the central portion 18–8 of the X-strut frame member bottom section 18–1, at a location spaced from the apex 18–9.

The X-strut frame member top section 18–2 has a threaded end portion 18–11 extending at an obtuse angle from the central portion 18–12, there being an apex 18–13 between the threaded end portion 18–11 and the central portion 18–12. Nuts 18–14 are separably screwed on the threaded end portion 18–11.

Figure 7:
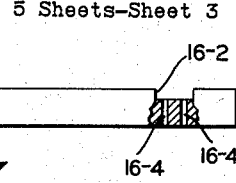
Fig. 7 is a detached elevational view of the ridge frame member of the assembled A frame unit.

As best shown in Figs. 3 and 7, the ridge frame member 16 has formed therein an upwardly opening notch 16–1 adjacent one end, and an upwardly opening notch 16–2 adjacent the other end. A pair of bores 16–3 extend and open between the bottom of the notch 16–1 and the under side of the ridge frame member 16; and a pair of bores 16–4 extend and open between the bottom of the notch 16–2 and the under side of the ridge frame member 16.

The details of the separable connections of one of the sets of X-strut frame members 17 and 18 with the base end tube 14 and with the ridge frame member 16 are best shown in Fig. 3. The hook end portions 17–7 and 18–7 of the members 17 and 18 telescopingly fit in the opposite ends of the base end tube 14. The upper threaded end portion 17–11 of the member 17 extends through one of the bores 16–4 of the ridge frame member 16; and the threaded end portion 18–11 of the member 18 extends through one of the bores 16–3 of the ridge frame member 16. The nuts 17–14 are screwed on the threaded end portion 17–11 against the bottom of notch 16–2 and the under side of the ridge frame member 16; and the nuts 18–14 are screwed on the threaded end portion 18–11 against the bottom of the notch 16–1 and the under side of the ridge frame member 16.

The separable connections between the other set of X-strut frame members 17 and 18 with the base end tube 15 and with the ridge frame member 16, are made in the same manner as above described for the one set.

Figure 8:
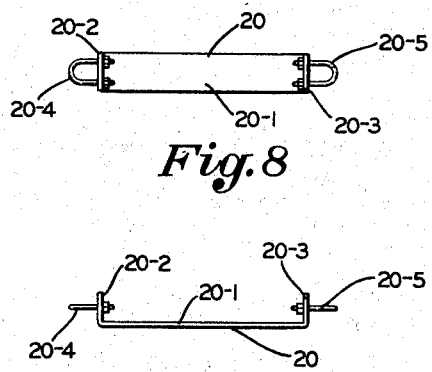
Fig. 8 is a detached top plan view of the crossing tie member of the assembled A frame unit.
Figure 9:
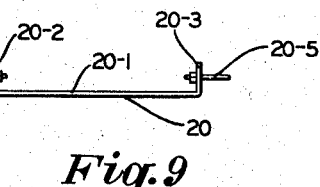
Fig. 9 is a detached elevational view of the crossing tie member of Fig. 8.

As best shown in Figs. 2, 8, and 9, the tie member 20 includes an elongated central portion 20–1, and opposite angled end portions 20–2 and 20–3, formed in a length of strap metal. Each of the angled end portions 20–2 and 20–3 has a pair of holes formed therein which separably receive respectively the legs of U-bolts 20–4 and 20–5. In the assembled A frame unit 10, each of the U-bolts 20–4 and 20–5 engirdles a set of the members 17 and 18 at their crossing 19, the threaded legs of each U-bolt extending through the holes in one of the tie member angled end portions 20–2 and 20–3, and nuts are screwed on the U-bolt threaded legs against the tie member angled end portions.

Figure 11:
Fig. 11 is a detached top plan view of one of the hook tie rods of the assembled A frame unit.

As best shown in Figs. 3 and 11, each hook tie rod 21 includes an elongated central portion 21–1, a pivoting U-end portion 21–2, and a hook end portion 21–3. The hook end portion 21–3 extends at an acute angle with the central portion 21–1, and there is an apex 21–4 between the hook end portion 21–3 and the central portion 21–1. The pivoting U-end portion 21–2 is interengaged with one of the hook catch annular washers 17–10 or 18–10 of one of the sets of X-strut frame members 17 and 18, and the hook end portion is hooked into the other washer 18–10 or 17–10.

Figure 10:
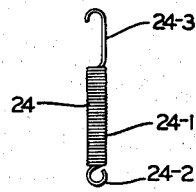
Fig. 10 is a detached elevational view of one of the cover hold-down springs of the assembled A frame unit.

As best shown in Figs. 3 and 10, each cover hold-down helix spring 24 includes a central helix portion 24–1, a circle loop end portion 24–2, and an elongated hook end portion 24–3. The circle loop end portion 24–2 is connected with one of the annular washers 17–10 or 18–10, and the elongated hook end portion 24–3 is connected with one of the cover end sleeves 22–1 or 22–2, and the pull bar 23 contained therein.

As shown in Fig. 1, hold-down weights 25 may be placed on top of the base 11. The weights 25 may be cartons of cans of motor oil.

The cover 22 presents at each side of the assembled A frame unit 10, a panel on which advertising copy may be painted or printed.

It is apparent, that the assembled A frame unit 10 may be put together without tools, and may be taken apart and placed in a compact package unit having a small bulk or volume as compared with the bulk or volume of the assembled unit.

A second preferred embodiment of an assembled A frame unit of the present invention, and parts thereof, are illustrated in Figs. 12 to 19, inclusive.

The second preferred embodiment of the assembled A frame unit is indicated generally by 110, and includes a rectangular base, indicated generally by 111, which is a rectangular frame including laterally spaced parallel side bars 112 and 113 and laterally spaced parallel tubes 114 and 115 at opposite ends of the frame. The end tubes 114 and 115 extend between and abut against inside faces of the side bars 112 and 113.

As shown, the side bars 112 and 113 are vertical legs of angle bars, and at end corners of the frame 111, each end of each side bar 112 and 113 has formed therein a circular hole registering with the abutting open end of one of the tubes 114 and 115.

A ridge frame member indicated generally by 116 is spaced above the base 111 and extends parallel with the parallel end tubes 114 and 115.

A set of X-strut frame members 117–1 and 117–2, and 118–1 and 118–2, extends between base 111 and the ridge frame member 116, and has separable connections with the corner openings of the base end tube 114 and registering holes in the side bars 112 and 113, and has separable connections with end portions of the ridge frame member 116.

The X-strut frame members 117–1 and 118–1, and the X-strut frame members 117–2 and 118–2 converge towards each other and are connected with each other by an X-crossing connector indicated generally by 119.

A tie member indicated generally by 120' extends between the X-crossing connectors 119 of the two sets of X-strut frame members, and at each end the tie member 120 has a separable connection with the adjacent X-crossing connector 119.

Adjacent each base end tube 114 and base end tube 115, a tie wire 121 extends parallel with the end tubes, and each tie wire 121 at opposite ends has separable connections with the side bars 112 and 113.

A one-piece rectangular cover indicated generally by 122 extends over and may be connected with the ridge frame member 116, and includes an end sleeve 122–1 spaced above the base end tube 114. In the end sleeve 122–1, there is located a pull bar 123. Cover hold-down helix springs 124, one at each rear corner of the assembled A frame unit 110, each has a separable connection with the pull bar 123 and the sleeve 122–1 in which it is located, and with a rear end portion of one of the base side bars 112 or 113.

The cover 122, as thus far described, and as shown in Fig. 12, covers the rear set of X-strut frame members in the A frame unit 110. The front set of X-strut frame members of the A frame unit 110, is also preferably covered in a similar manner by a front extension of the cover 122, not shown.

In each set of X-strut frame members, the lower frame member 117–1 has an upper end portion 117–6, and the lower frame member 118–1 has an upper end portion 118–6, and each of the frame member upper end portions 117–6 and 118–6 separably fits in the lower portion of the X-crossing connector 119 of the particular set.

The lower X-strut frame member 117–1 of each set includes a lower hook end portion 117–7 extending at an acute angle from the central portion of the frame member 117–1, and each hook end portion 117–7 extends through one of the holes 112a of the base side bar 112 and into the registering open end of one of the tubes 114 or 115. In a similar manner, the lower X-strut frame member 118–1 of each set includes a lower hook end portion 118–7 extending at an acute angle from the central portion of the frame member 118–1, and each hook end portion 118–7 extends through one of the holes of the base side bar 113 and into the registering open end of one of the tubes 114 or 115.

In each set of X-strut frame members, the upper frame member 117–2 has a lower end portion 117–4, and the upper frame member 118–2 has a lower end portion 118–4, and each of the frame member lower end portions 117–4 and 118–4 separably fits in the upper portion of the X-crossing connector 119 of the particular set.

The upper X-strut frame member 117–2 of each set includes an upper threaded end portion 117–11 extending at an obtuse angle from the central portion of the frame member 117–2, and the upper X-strut frame member 118–2 of each set includes an upper threaded end portion 118–11 extending at an obtuse angle from the central portion of the frame member 118–2.

The ridge frame member 116 has formed therein adjacent each end a plurality of bores. At one end of the ridge frame member 116, the upper threaded end portions 117–11 of the frame members 117–2 extend through the ridge frame member bores, and nuts 117–14 clamp the threaded end portions 117–11 to the ridge frame member 116. At the other end of the ridge frame member 116, the upper threaded end portions 118–11 of the frame members 118–2 extend through the ridge frame member portions, and nuts 118–14 clamp the threaded end portions 118–11 to the ridge frame member 116.

As best shown in Fig. 13, the tie member 120' includes an elongated central portion 120–1 and opposite angled end portions 120–2 and 120–3, formed in a length of strap metal. Each of the angled end portions 120–2 and 120–3 has a hole formed therein for enabling connection by nut and bolt means of each tie member end portion to one of the X-crossing connectors 119.

As best shown in Figs. 14 to 19, inclusive, each X-crossing connector 119 includes a backing plate 126 which is preferably as shown a channel including a web 120 and side flanges 119a and 119b.

The web 120 has an inner face 123 and upper and lower free ends 124 and 125 between the flanges 119a and 119b. Midway between the channel web ends 124 and 125, a stop flange 126 protrudes outwardly from the web inner face 123. Above the stop flange 126 angled guide flanges 127 and 128 protrude outwardly from the inner face 123 of the channel web 120. Below the stop flange 126 angled guide flanges 129 and 130 protrude outwardly from the inner face 123 of the channel web 120. The flanges 127 and 128 make equal angles with the vertical longitudinal center axis of the channel web 120, and the flanges 127 and 128 have inner ends spaced from the stop flange 126, and the flanges 127 and 128 flare outwardly from their inner ends in the direction of the channel web upper end 124. The lower guide flanges 129 and 130 are similarly and oppositely arranged with respect to the longitudinal center axis of the channel web 120.

Thus, the guide flange 127 is parallel with the guide flange 130, and the guide flange 128 is parallel with the guide flange 129. The stop flange 126 is located at the X-crossing junction of the connector 119. Between the upper guide flanges 127 and 128, the channel web 120 has formed therein a preferably square hole 131; and between the lower guide flanges 129 and 130, the channel web 120 has formed therein a preferably square hole 132.

As shown, the flanges 127 and 128 are formed at opposite angled edges of a triangular gusset plate 133 which is spot welded to the channel web 120, and the gusset plate 133 has formed therein a circular hole 134 registering with the square hole 131 in the channel web 120. In a similar manner as shown, the lower guide flanges 129 and 130 extend from angled edges of a triangular gusset plate 135 which is spot welded to the channel web 120, and the gusset plate 135 has formed therein a circular hole 136 registering with the square hole 132 in the channel web 120.

Each connector 119 furthermore includes an upper triangular clamp plate 137 and a lower triangular clamp plate 138. The upper triangular clamp plate 137 includes a triangular gusset web 139 from the angled side edges of which there extends angled guide flanges 140 and 141. The gusset web 139 has formed therein a circular hole registerable with the square hole 131 in the backing plate channel web 120, whereby upper nut and bolt means 142 may releasably clamp connect the backing plate channel web 120, the clamp 137, and one of the tie member 120, the shank of the bolt of the nut and bolt means 142 passing through said registering holes.

In a similar manner, the lower triangular clamp plate 138 includes a triangular gusset web 143 having angled edges from which protrude guide flanges 144 and 145. The gusset web 143 has formed therein a circular hole which is registerable with the backing plate square hole 132. Accordingly, lower nut and bolt means 146 may releasably connect the clamping plate 138 on the backing plate channel web 120, the shank of the bolt of the nut and bolt means 146 passing through said registering holes.

In the assembled condition, as shown in Fig. 14, the upper clamping plate flange 140 is parallel with the backing plate flange 127, and spaced therefrom a distance such that the lower end 118–4 of the rear upper X-strut frame member 118–2 is separably and slidably received in the sleeve opening formed by the upper clamp plate gusset web 139 and the backing plate web 120 and the angled flanges 140 and 127.

In a similar manner, a sleeve opening is formed by the gusset web 139 of the upper clamp plate 137 and the backing plate web 120 and the flanges 128 and 141, and the lower end portion 117–4 of the rear X-strut frame member 117–2 is received in this sleeve opening.

In the assembled construction, as shown in Fig. 14, the lower extremities of the frame members 117–2 and 118–2 abut against the upper face of the stop flange 126.

In a similar manner, a sleeve opening is formed by the gusset web 143 of the lower clamp plate 138 and the backing plate web 120 and the flanges 129 and 144, and the upper end portion 117–6 of the rear X-strut frame member 117–1 is received in this sleeve opening.

Likewise, a sleeve opening is formed by the gusset web 143 of the lower clamp plate 138 and the backing plate web 120 and the flanges 130 and 145, and the upper end portion 118–6 of the rear X-strut frame member 118–1 is received in this sleeve opening.

In the assembled construction, as shown in Fig. 14, the upper extremities of the frame members 117–1 and 118–1 abut against the lower face of the stop flange 126.

The A frame unit 110 may be anchored to a base of earth, asphalt, or similar material, by hook stakes 150 each including a shank 151 and a hook head 152. Each stake 150 may have its shank pounded into the base and its angled head 152 hooked over one of the side bars 112 or 113. If the base is made of other material such as concrete, which is too hard to permit pounding the stakes 150 into such base, then screw anchor plugs may be installed in the base, and the shanks 151 of the hook stakes 150 may be threaded and screwed into the screw anchor plugs.

We claim:

1. Unitary A frame construction including a base having opposite end portions, a ridge frame member spaced from the base, and two sets of strut frame members; each set extending between one of the base end portions and the ridge frame member; and each set including lower strut frame members each including a lower end portion, and a separable connection between each lower strut frame member lower end portion and one of the base end portions; and each set including upper strut frame members each including an upper end portion, and a separable connection between each upper strut frame member upper end portion and the ridge frame member; and each lower strut frame member of each set including an upper end portion, and each upper strut frame member of each set including a lower end portion, and a separable connection between each upper strut frame member lower end portion and the upper end portion of one of the lower strut frame members; and the strut frame members of each set constituting X-strut frame members, and the separable connections constituting X-crossing means for clampingly holding together the upper end portions of the lower strut frame members and the lower end portions of the upper strut frame members of corresponding sets of strut frame members.

2. Unitary A frame construction including a base having opposite end portions, a ridge frame member spaced from the base, and two sets of strut frame members; each set extending between one of the base end portions and the ridge frame member; and each set including lower strut frame members each including a lower end portion, and a separable connection between each lower strut frame member lower end portion and one of the base end portions; and each set including upper strut frame members each including an upper end portion, and a separable connection between each upper strut frame member upper end portion and the ridge frame member; and each lower strut frame member of each set including an upper end portion, and each upper strut frame member of each set including a lower end portion, and a separable connection between each upper strut frame member lower end portion and the upper end portion of one of the lower strut frame members; and the strut frame members of each set constituting X-strut frame members, and the separable connections constituting X-crossing means for clampingly holding together the upper end portions of the lower strut frame members and the lower end portions of the upper strut frame members of corresponding sets of strut frame members; and a tie member extending between the X-crossings of the sets of X-strut frame members, and means connecting each X-crossing means with the tie member.

3. Unitary A frame construction including a base having opposite end portions, a ridge frame member spaced from the base, and two sets of strut frame members; each set extending between one of the base end portions and the ridge frame member; and each set including lower strut frame members each including a lower end portion, and a separable connection between each lower strut frame member lower end portion and one of the base end portions; and each set including upper strut frame members each including an upper end portion, and a separable connection between each upper strut frame member upper end portion and the ridge frame member; and each lower strut frame member of each set including an upper end portion, and each upper strut frame member of each set including a lower end portion, and a separable connection between each upper strut frame member lower end portion and the upper end portion of one of the lower strut frame members; and the strut frame members of each set constituting X-strut frame members, and the separable connections constituting X-crossing means for clampingly holding together the upper end portions of the lower strut frame members and the lower end portions of the upper strut frame members of corresponding sets of strut frame members; and a tie member extending between the X-crossings of the sets of X-strut frame members, and means connecting each X-crossing means with the tie member; and a tie rod extending between the lower X-strut frame members of each set adjacent the base, each tie rod having a separable connection with one of the lower X-strut frame members.

4. Unitary A frame construction including a base having opposite end portions, a ridge frame member spaced from the base, and two sets of strut frame members; each set extending between one of the base end portions and the ridge frame member; and each set including lower strut frame member end portions, and separable connection means between each lower strut frame member end portion and one of the base end portions; and each set including upper strut frame member end portions, and a separable connection between each upper strut frame member end portion and the ridge frame member; and each base end portion having opposite end corners, and one of the lower strut frame member lower end portions terminating at each base end corner, and the separable connection means between each corner frame member end portion and its associated base end corner including a tube having an end on the base end corner and including a hook on the corner frame member end portion telescopingly fitting the tube end.

5. Unitary A frame construction including a base having opposite end portions, a ridge frame member spaced from the base, and two sets of strut frame members; each set extending between one of the base end portions and the ridge frame member; and each set including lower strut frame member end portions, and separable connection means between each lower strut frame member end portion and one of the base end portions; and each set including upper strut frame member end portions, and a separable connection between each upper strut frame member end portion and the ridge frame member; and the base including two laterally spaced side bars between and connected to the base end portions, each side bar having opposite end portions forming a corner with one of the base end portions, each side bar end portion having a hole formed therein, and one of the lower strut frame member lower end portions terminating at each base side bar end portion, said means including a hook extending through the hole in and engaging the associated side bar end portion.

6. Unitary A frame construction including a base having opposite end portions, a ridge frame member spaced from the base, and two sets of strut frame members; each set extending between one of the base end portions and the ridge frame member; and each set including lower strut frame member end portions, and separable connection means between each lower strut frame member end portion and one of the base end portions; and each set including upper strut frame member end portions, and a separable connection between each upper strut frame member end portion and the ridge frame member; and the base including two laterally spaced side bars between and connected to the base end portions, each side bar having opposite end portions forming a corner with one of the base end portions, each side bar end portion having a hole formed therein, and one of the lower strut frame member lower end portions terminating at each base side bar end portion, said means including a hook extending through the hole in and engaging the associated side bar end portion, and the base including a plurality of compression members extending between the side bars, said means including a plurality of tension members extending between and tying the side bars against the compression members.

7. Unitary A frame construction including a base having opposite end portions, a ridge frame member spaced from the base, and two sets of strut frame members; each set extending between one of the base end portions and the ridge frame member; and each set including lower strut frame member end portions, and separable connection means between each lower strut frame member end portion and one of the base end portions; and each set including upper strut frame member end portions, and a separable connection between each upper strut frame member end portion and the ridge frame member; and the base including two laterally spaced side bars between and connected to the base end portions, each side bar having opposite end portions forming a corner with one of the base end portions, each side bar end portion having a hole formed therein, and one of the lower strut frame member lower end portions terminating at each base side bar end portion, said means including a hook extending through the hole in and engaging the associated side bar end portion, and the base including a plurality of compression members extending between the side bars, said means including a plurality of tension members extending between and tying the side bars against the compresison members, the hooks at each base end portion extending towards each other, and one of the compression members having ends fitting on the hooks at each base end portion.

8. Unitary A frame construction including a base having opposite end portions, a ridge frame member spaced from the base, and two sets of strut frame members; each set extending between one of the base end portions and the ridge frame member; and each set in-including lower strut frame members each including a lower end portion, separable connection means between each lower strut frame member lower end portion and one of the base end portions; and each set including upper strut frame members each including an upper end portion, separable connection means between each upper strut frame member upper end portion and the ridge frame member; and each lower strut frame member of each set including an upper end portion, and each upper strut frame member of each set including a lower end portion; the lower strut frame members of each set sloping towards each other, and the upper strut frame members of each set sloping towards each other, and X-crossing connector means clampingly holding together the upper end portions of the sloping lower strut frame members and the lower end portions of the sloping upper strut frame members.

9. Unitary A frame construction including a base having opposite end portions, a ridge frame member spaced from the base, and two sets of strut frame members; each set extending between one of the base end portions and the ridge frame member; and each set including lower strut frame members each including a lower end portion, separable connection means between each lower strut frame member lower end portion and one of the base end portions; and each set including upper strut frame members each including an upper end portion, and a separable connection between each upper strut frame member upper end portion and the ridge frame member; and each lower strut frame member of each set including an upper end portion, and each upper strut frame member of each set including a lower end portion; the lower strut frame members of each set slop-ing towards each other, and the upper strut frame members of each set sloping towards each other, and X-crossing connector means connecting together the upper end portions of the sloping lower strut frame members and the lower end portions of the sloping upper strut frame members; the X-crossing having a junction point between the upper end portions of the sloping lower strut members and the lower end portions of the sloping upper strut frame members, and the X-crossing connector means including a backing plate at one side of the connected frame member end portions, the backing plate upper and lower portions extending in opposite directions from the X-crossing junction point towards the ridge frame member and towards the base, the X-crossing connector means also including an upper clamp plate on the other side of the lower end portions of the upper strut frame members, and nut and bolt means clamping the upper clamp plate and the upper portion of the backing plate against the opposite sides of the lower end portions of the upper strut frame members, the X-crossing connector means also including a lower clamp plate on the other side of the upper end portions of the lower strut frame members, and nut and bolt means clamping the lower clamp plate and the lower portion of the backing plate against the opposite sides of the upper end portions of the lower strut frame members.

10. Unitary A frame construction including a base having opposite end portions, a ridge frame member spaced from the base, and two sets of strut frame members; each set extending between one of the base end portions and the ridge frame member; and each set including lower strut frame members each including a lower end portion, separable connection means between each lower strut frame member lower end portion and one of the base end portions; and each set including upper strut frame members each including an upper end portion, and a separable connection between each upper strut frame member upper end portion and the ridge frame member; and each lower strut frame member of each set including an upper end portion, and each upper strut frame member of each set including a lower end portion; the lower strut frame members of each set sloping towards each other, and the upper strut frame members of each set sloping towards each other, and X-crossing connector means connecting together the upper end portions of the sloping lower strut frame members and the lower end portions of the sloping upper strut frame members; the X-crossing having a junction point between the upper end portions of the sloping lower strut members and the lower end portions of the sloping upper strut frame members, and the X-crossing connector means including a backing plate at one side of the connected frame member end portions, the backing plate upper and lower portions extending in opposite directions from the X-crossing junction point towards the ridge frame member and towards the base, the X-crossing connector means also including an upper clamp plate on the other side of the lower end portions of the upper strut frame members, and nut and bolt means clamping the upper clamp plate and the upper portion of the backing plate against the opposite sides of the lower end portions of the upper strut frame members, the X-crossing connector means also including a lower clamp plate on the other side of the upper end portions of the lower strut frame members, and nut and bolt means clamping the lower clamp plate and the lower portion of the backing plate against the opposite sides of the upper end portions of the lower strut frame members; and the X-crossing connector means also including a stop flange protruding from one side of the backing plate at the X-crossing junction between the lower end portions of the upper strut frame members and the upper end portions of the lower strut frame members.

References Cited in the file of this patent

UNITED STATES PATENTS

| | | |
|---|---|---|
| 413,730 | Palmer | Oct. 29, 1889 |
| 435,155 | Schemann | Aug. 26, 1890 |
| 1,170,865 | Anderson | Feb. 8, 1916 |
| 1,192,039 | Converse | July 25, 1916 |
| 1,280,174 | Dancer | Oct. 1, 1918 |
| 1,666,961 | Delvin | Apr. 24, 1928 |
| 1,728,356 | Morgan | Sept. 17, 1929 |
| 2,243,638 | Larsson | May 27, 1941 |
| 2,420,898 | Miner | May 20, 1947 |
| 2,703,690 | Petrick et al. | Mar. 8, 1955 |